United States Patent [19]

Benedicto, Jr. et al.

[11] Patent Number: 5,247,981
[45] Date of Patent: Sep. 28, 1993

[54] METHOD OF MAJOR SECTIONAL TIRE REPAIR AND PRODUCT THEREOF

[76] Inventors: Isidro G. Benedicto, Jr.; Ricardo A. Garchitorena, both of 4453 W. Pine Blvd., #11, St. Louis, Mo. 63108

[21] Appl. No.: 665,099

[22] Filed: Mar. 6, 1991

[51] Int. Cl.⁵ .............................................. B29C 73/00
[52] U.S. Cl. ................................... 152/370; 156/97; 264/36
[58] Field of Search .................. 156/97, 95, 98; 152/367–373; 138/97–99; 264/36; 425/11, 17; 606/228

[56] References Cited

U.S. PATENT DOCUMENTS

| | | |
|---|---|---|
| 326,012 | 9/1885 | Brooks . |
| 521,740 | 6/1894 | Tillinghast et al. ................. 156/97 |
| 568,794 | 10/1896 | Rehbein . |
| 1,016,349 | 2/1912 | McKee . |
| 1,597,473 | 8/1926 | Nitzsche . |
| 2,793,675 | 5/1957 | Simpson ................................ 154/14 |
| 2,884,041 | 4/1959 | Mullen ................................ 152/362 |
| 3,152,942 | 10/1964 | Horton et al. ...................... 156/421 |
| 3,919,021 | 11/1975 | Whittle ................................ 156/97 |

FOREIGN PATENT DOCUMENTS 539254  6/1922  France .................................. 152/368

Primary Examiner—Geoffrey L. Knable
Attorney, Agent, or Firm—Grace J. Fishel

[57] ABSTRACT

A process for making a sectional repair to a tire which increases the range of repairable injuries and includes a number of steps culminating in a repaired tire. The steps are broadly characterized as preparing the tire (including inspecting the tire and preparing a generally Y-shaped skive), lacing the prepared skive, blocking the base of the skive, filling the skive with a plug of unvulcanized rubber and vulcanizing the plug.

20 Claims, 3 Drawing Sheets

METHOD OF MAJOR SECTIONAL TIRE REPAIR AND PRODUCT THEREOF

The present invention relates to a process of sectional tire. repair for repairing a major injury in a crown, shoulder or sidewall of a tire and to the tires so repaired. It greatly increases the range of injuries which are repairable and decreases the number of tires which must be thrown away.

BACKGROUND OF THE INVENTION

Commercially available repair units for repairing truck, agricultural and earthmoving equipment tires and the like are generally limited to the repair of injuries measuring less than about six inches in length. If the injury is greater than about six inches, the tire must be thrown away.

In an ordinary sectional repair, the injuring item is removed and a Y-shaped skive formed in the tire. The skive opens outwardly and is blocked at its lower end with a platform attached to the inner wall of the tire. The skive is packed with a plug of unvulcanized rubber. A patch is applied on the inside of the tire over the platform. Depending on the capacity of the vulcanizing equipment, the patch can be vulcanized with the plug or it may be applied later and chemically vulcanized. If the injury is too large, there is a tendency for the tire to bulge at the repaired skive and a possibility that the tire may rupture.

Truck tires and agricultural and earthmoving equipment tires and the like are expensive to replace and, in addition, many states regulate their disposal. In addition to environmental issues, there are national security and balance of trade implications for oil importing nations because tires are made from oil. In some cases depending on where the injured tires are located (i.e., cost to collect and transport) and the size of the tires, the tires can be chipped up and used for fuel or recycled. For large off-the-road-tires recycling or burning is not an option because there is no equipment presently available to grind them and for all tires even at best, the alternatives for disposal are wasteful.

In view of the above, there is a need for a sectional tire repair process which increases the range of repairable injuries and for the tires which have been repaired.

SUMMARY OF THE INVENTION

A main feature of the present invention is to provide a method for making a sectional repair in a pneumatic tire having a major injury in the crown, shoulder or sidewall. The tire is prepared for repair by the steps of inspecting the tire for repairability, locating the injury and removing the injuring object if present, forming a Y-shaped skive having a flanged surface flared outwardly and angled upwardly from the injury and a stem having a surface connecting with the inner wall of the tire and preparing the surfaces of the Y-shaped skive and inner wall around the injury for adhesion of vulcanizable rubber. The injury is then lace tied which includes the steps of forming lace holes in the flanged surface passing from the inside to the outside of the tire and lacing the lace holes with a lace. The process is completed with the steps of blocking the base of the Y-shaped skive with a platform of unvulcanized rubber, filling the Y-shaped skive with unvulcanized rubber in a manner to exclude entrapment of air to a level which is above the outer surface of the tire forming a plug and vulcanizing the plug and platform. At the end of the process, the injury is closed and the tire can be returned to service.

In a preferred embodiment, the lace holes are formed in a zig-zag pattern on both sides of the injury and the lace knotted between each pair of opposing holes. The zig-zag pattern keeps the repaired area from bulging and the lace holes from being pulled out, whereas the knotting avoids run away if one of the stitches or lace holes breaks.

An important object of the invention is to provide a method for repairing tires having an injury which is too large to be repaired by an ordinary sectional repair and to provide tires which have been repaired by the above-mentioned method. The invention increases the range of injuries which are repairable and decreases the number of tires which must be thrown away. It also provides a repaired tire wherein the repaired injury is as strong as the original tire carcass and the expected future service life of the tire is as though no injury had ever occurred.

Other objects and features of the invention will be in part apparent and in part pointed out hereinafter.

BRIEF DESCRIPTION OF THE DRAWINGS

In the accompanying drawings, in which one of various possible embodiments of the invention is illustrated, corresponding reference characters refer to corresponding parts throughout the several views of the drawings and in which.

DETAILED DESCRIPTION OF THE INVENTION

Figure 1:
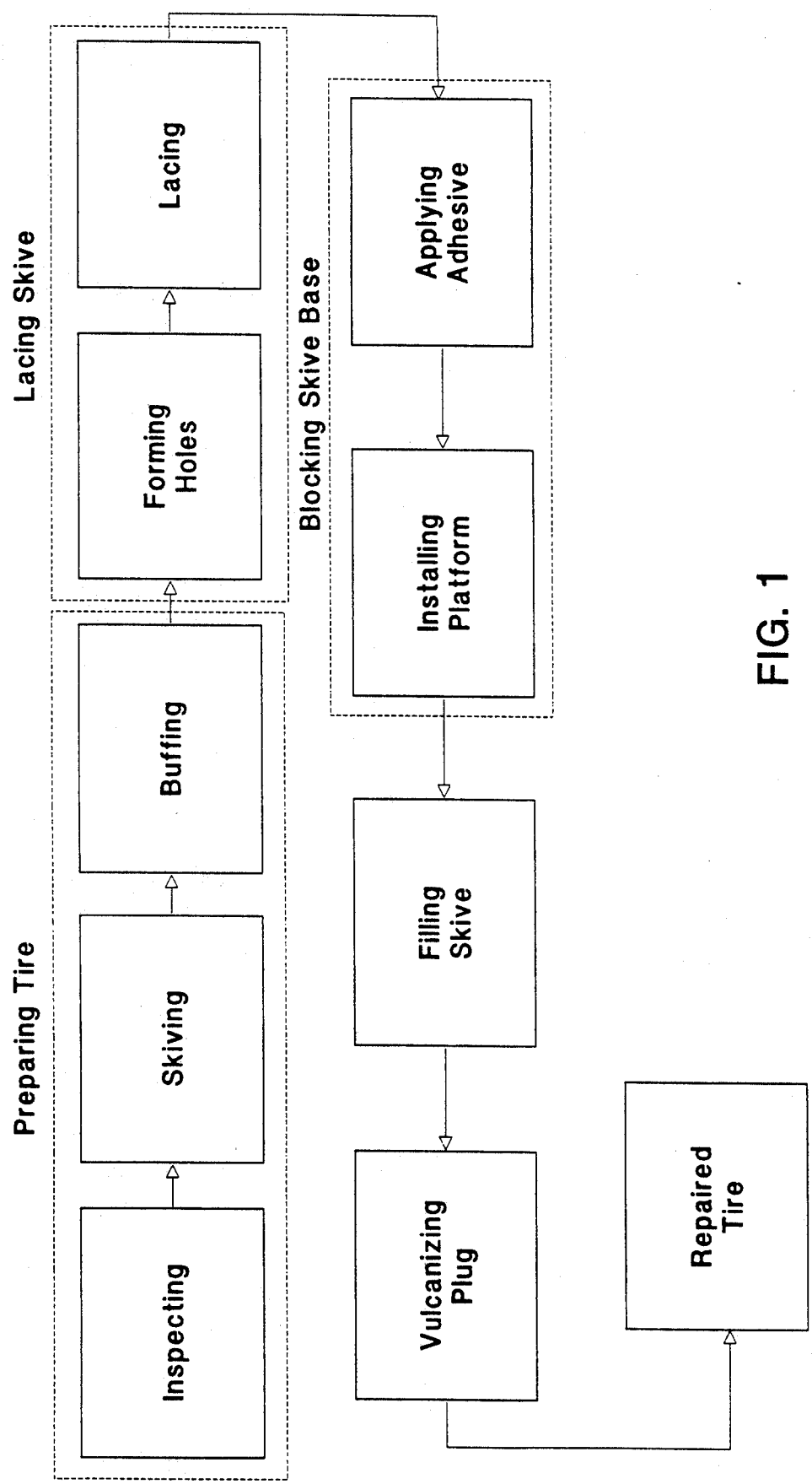
FIG. 1. is a schematic view of a sectional tire repairing method illustrating the principals of the present invention.

Referring to the drawings, the method of the present invention will be described with reference to the flow chart shown in FIG. 1 and to the views of a tire undergoing repair shown FIGS. 2-8.

The method and repaired tire herein described finds its greatest utility in connection with truck tires and large tires for off-the-road vehicles such as used in agriculture, road construction equipment, strip mining or the like. However, the invention may be used equally well for repairing all pneumatic tires as will be understood from the description to follow.

Referring now particularly to FIG. 1, the method of the present invention includes a number of steps culminating in a repaired tire. The steps may be broadly characterized as preparing the tire (including inspecting the tire and preparing a generally Y-shaped skive), lacing the prepared skive, blocking the base of the skive, filling the skive with a plug of unvulcanized rubber and vulcanizing the plug.

A tire 10 with an injury 12 which is too large for an ordinary sectional tire repair is inspected to determine if it is a candidate for repair by the method of the present invention. (It will be understood that tires which can be repaired with an ordinary sectional repair can be repaired by the present process but whatever benefits that might be obtained are counterbalanced by extra cost.)

Tires should not be repaired if the injury is a result of an innate defect in the tire. Nor should the tire be repaired if it shows signs of run flat or under-inflation, casing separations, visible, deformed or broken bead wires, weather checking exposing the cord, sidewall or tread cracking to the cord, severe sidewall scuffing exposing the cord and so forth.

Figure 2:
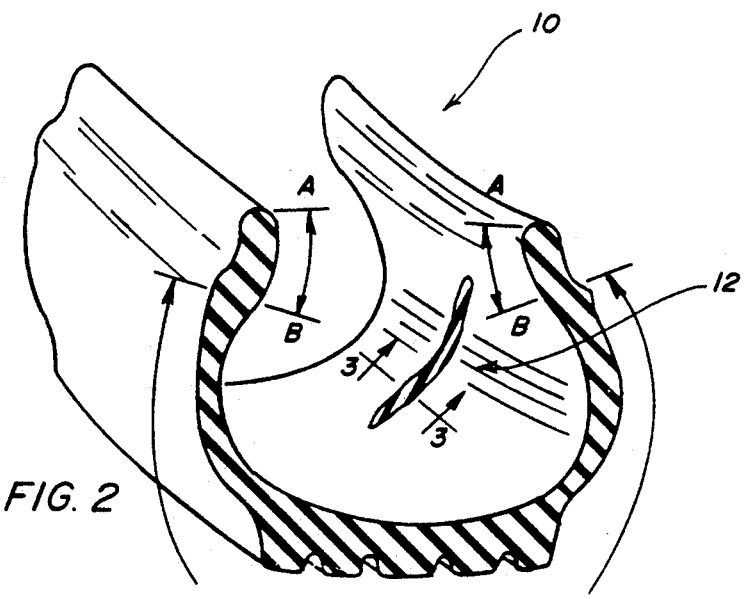
FIG. 2 is a perspective view of a portion of a tire having a major injury in the sidewall (extending into the shoulder and crown) thereof.

The location of the injury has an effect on repairability. Whether the tire is bias ply or radial in construction, the injury must not be too close to the bead (i.e., in the area between A and B as shown in FIG. 2) and in the case of a radial tire sidewall injury should not extend over more than about two cords in the direction of travel (i.e., concentric to the bead). The injury may be complex and is not limited to a simple slash. It may take the form of an arm and a leg, evulsion or flap or be stellate, serrated and so forth as long as the tire is not blown out.

Figure 3:
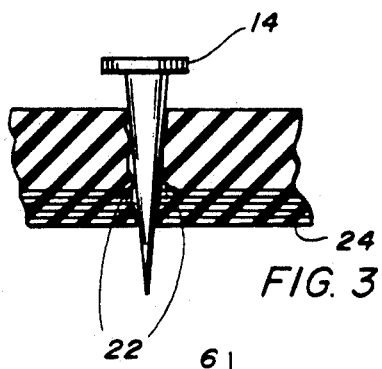
FIG. 3 is a sectional view taken along line 3—3 in FIG. 2.
Figure 4:
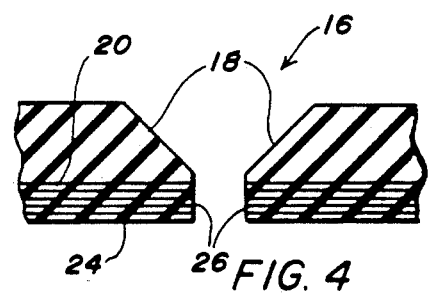
FIG. 4 is like FIG. 3 but with a Y-shaped skive formed around the injury.
Figure 5:
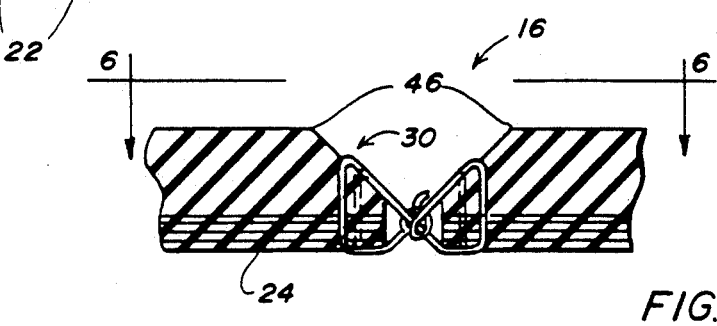
FIG. 5 is like FIG. 4 but with the injury lace tied.

If tire 10 passes inspection, injury 12 should be located and marked on the inside and outside of the tire and, if present as shown in FIG. 3, injuring object(s) 14 should be removed. The extent of the damage should be determined with a probe and the injury checked for possible ply separation. The tire should be rejected at this point if there is so much ply separation that it cannot be excised without greatly increasing the size of the skive opening but a tire with a major injury otherwise a candidate for repair can be repaired.

The term skive as it applies to tire repairing refers to the removal of damaged material prior to making a repair. In the subject process, a Y-shaped skive 16 is formed in the tire carcass around the injury. To begin Y-shaped skive 16, surface rubber is removed by buffing or the like from the outside of tire 10 around injury 12 forming a flanged surface 18 for attachment of the plug. Surface 18 is flared outwardly and angled upwardly from the injury, preferably at an angle of about 45 degrees from just above top ply 20 (in the case of an injury to a bias ply tire) or just above the steel cables or belts (in the case of an injury to the sidewall or crown of a radial tire, respectively). The removal of the surface rubber also gives the operator good exposure to the injury thus permitting him to visualize and explore the extent of the wound.

Damaged plies, steel cables, rubber and so forth 22 in the injury are then removed at a 90 degree angle (or substantially or generally 90 degrees) to inner wall 24 of the tire. This incision forms the stem of Y-shaped skive 16 and provides a surface 26 which communicates with inner wall 24 of the tire. This operation can be accomplished in a bias ply tire with a rasp or the like and in a radial tire having steel cords or belts with a tungsten carbide burr or the like. Enough material should be removed that injury 12 is opened out to good solid rubber and then the injury should be probed with an awl, spiral cement tool or other suitable tool to make sure that all damaged material 22 has been removed. This is necessary because damaged material will weaken the plug. If the cables remain frayed, an aluminum oxide stone or other suitable tool can be used to smooth them.

The surfaces of Y-shaped skive 16 and inner wall 24 of the tire around the injury are prepared to assure good adhesion to vulcanizable rubber. On the outside, flanged surface 18 can be texturized with a rubberhog (or other suitable buffing tool), preferably to the point that it somewhat roughened but generally velvety to the touch. On the inside, inner wall 24 can be cleaned with a scraper, cloth or some other agent such as a suitable solvent to the end that any dirt, oil, silicon or other contaminant which would interfere with bonding of the platform (and reinforcing patch) is removed. Buffing dust and other loosened material is removed inside and out with a vacuum or a brush prior to final cleaning such as with a solvent and a lintfree free cloth or the like. The length and width of Y-shaped skive 16 should be measured for use in selecting the patch for inner wall 24 and the depth should be measured for use in determining curing times.

The process thus far described generally parallels the preparation of a tire for an ordinary sectional repair except for the size of the injury which can be repaired.

Figure 6:
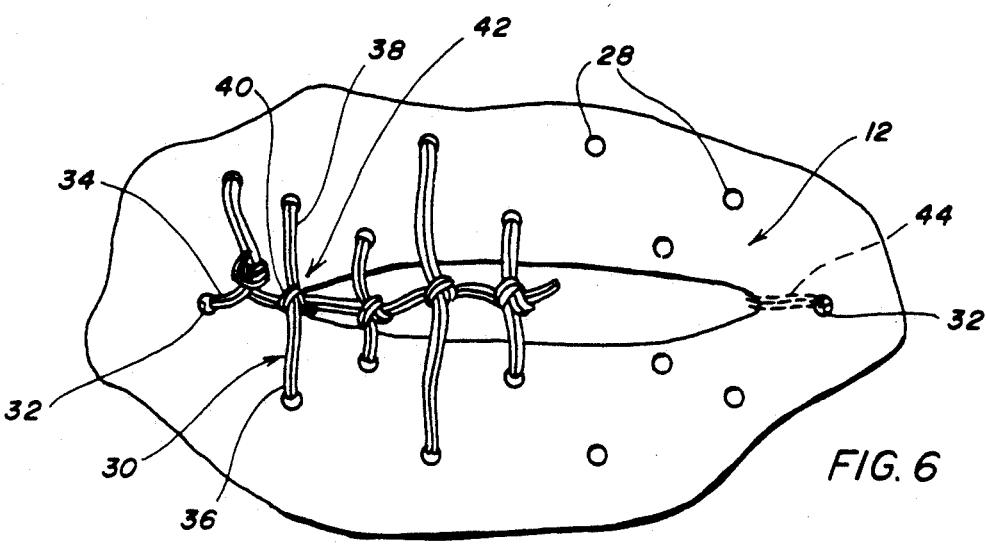
FIG. 6 is a plan view taken along line 6—6 in FIG. 5.
Figure 7:
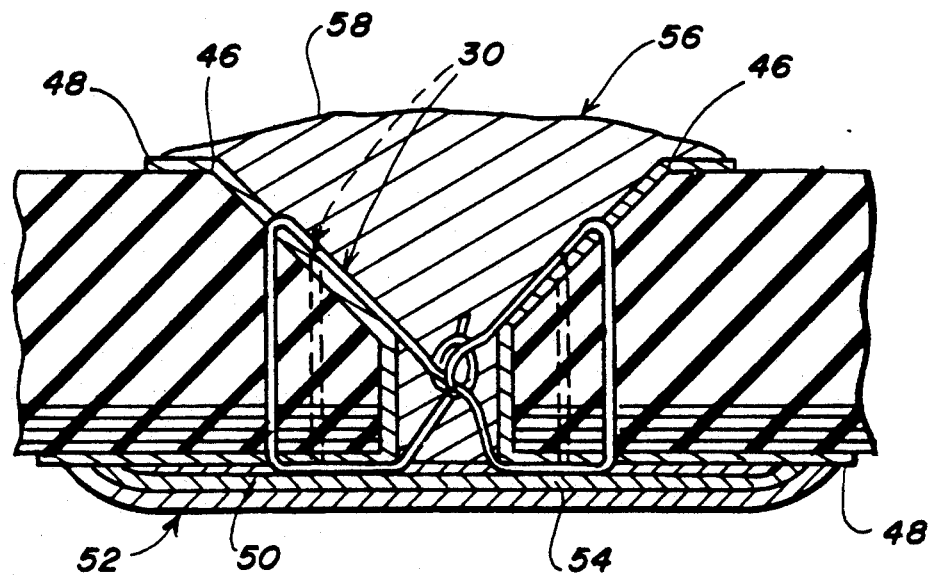
FIG. 7 is like FIG. 5 on an enlarged scale but with the Y-shaped skive filled with a plug; and, FIG. 8 is like FIG. 7 but with the overbuild above the plug removed.

In the next step, injury 12 is lace tied. As shown in FIG. 6, a lace hole 28 is provided on each side of injury 12, more typically in a series with an equal number of holes on each side. With continuing reference to FIG. 6, lace holes 28 are provided in pairs spaced at alternating distances from the edges of the injury. This arrangement is preferred because there is less tendency for a series of lace holes to be pulled out. A lace 30 is used to join opposing pairs of lace holes starting at one end of injury 12 and continuing through the series of lace holes.

Preferably, an additional hole 32 is provided at each end of injury 12 and lace 30 comprises a double strand formed from a single strand which is folded in half and tied in a loop through one of the end holes forming a beginning end stitch 34. Working from end stitch 34 on the outside as shown in FIG. 6, the end of double stranded lace 30 is passed through the closest hole on one side of injury 12 forming a first lacing stitch 36. The end of the lace is then passed through the injury to the outside of the tire and then back through the closest hole on the other side of the injury forming a second lacing stitch 38. The end of the lace is passed through the injury and behind first lacing stitch 36 forming a third lacing stitch 40. It is then passed through the injury to the outside and passed under third lacing stitch 40 forming a knot 42 around the first and second lacing stitches. With the knot around the first and second lacing stitches, there is less tendency for a failure to be propagated along the injury if one of the stitches breaks or if one of the lace holes pulls out. For that reason, it is advantageous to form knot 42 around the first and second lacing stitches rather than simply lacing the holes in a conventional manner (i.e., like a shoe). Knotting is particularly important for very large injuries.

The lacing process described above is continued through the series of paired holes. When the last pair have been laced together and knotted, the end of double stranded lace 30 is passed through end hole 32 forming an ending end stitch 44. It is then passed back through the injury to the outside and knotted around ending end stitch 44 and the ends trimmed. The particular lacing pattern illustrated in the drawings is highly effective but it will be understood that the invention has general application and is not limited thereto.

It is important that injury 12 be laced tight enough that the wound does not tend to balloon out when tire 10 is inflated. On the other hand, it should not be laced so tight that lace 30 pinches the edges of the wound together, otherwise the plug will have some tendency to rupture in service. Tension on lace 30 should be checked with a probe and adjusted, if necessary, before continuing further with the repair.

The diameter of lace holes 28 (and end holes 32) and their spacing from the side edges of injury 12 depends on the size of the tire and the size of the injury. Typically, holes 28 and 32 range in diameter from about ¼ to about ⅜ inch but it is possible that operative results can be obtained outside that range. Holes 28 and 32 are drilled (punched or the like) in flanged surface 18 below shoulders 46 of the wound such that the lacing is embedded in the plug when the repair is finished. On the other hand, holes 28 and 32 must be spaced inboard of the side edges and ends of injury 12 sufficiently far that they do not tend to pull through.

Lace 30 is preferably made of cord like that used in fabricating tires. It must be stronger than cotton cord and more flexible than wire. The specifics of its construction can be determined empirically based on the following guidelines. Particularly good results have been obtained with nylon cord but other elastomers and strong, flexible materials can also be used. As a rule of thumb, the ply rating of the tire is noted and lace 30 is formed from an equal number of nylon cords. For example, if the ply rating of a bias built tire is 16, a suitable lace 30 is formed from 16 nylon cords like the cords making up the fabric of the tire. By way of further example, if the tire is a radial tire, a lace which would be suitable for a bias built tire of similar size can be used. From the foregoing, it should be understood that the invention is not limited to the use of nylon cords, to the provision of nylon cords in a number matching the ply rating of the tire nor does it entirely rule out the possibility of providing lace 30 as a solid strand.

When the lacing process is complete, a coat of rubber cement 48 is applied to the texturized surfaces of Y-shaped skive 16, to prepared shoulders 46 and to the prepared area around the injury on inner wall 24. Coat of rubber cement 48 is allowed to dry and forms an adhesive layer of unvulcanized rubber for attachment of the vulcanizable platform and plug.

If the injury falls in the tread grooves of tire 10, the grooves around the injury should be dammed with pieces of vulcanized rubber prior to filling Y-shaped skive 16. If this is not done, the vulcanizable rubber used to fill the skive may flow away from the skive during vulcanization leaving a concave cured plug. If this happens, it will be necessary to buff, cement and refill the concave area to the proper height and vulcanize the rubber until proper curing is accomplished.

A platform 50 of vulcanizable rubber such as cushion gum is adhered (e. g., thumbed down and then stitched with a roller) to coat of rubber cement 48 at the base of Y-shape skive 16. While platform 50 can be a separate element, in practice it is advantageous that platform 50 be an integral part of patch 52. Patch 52 serves as a reinforcement behind the plug and platform 50 for distributing the load and preventing rupture of the repaired injury when the tire is returned to service. While specifics of a suitable patch 52 follow, the invention is not limited thereto.

For use herein, patch 52 is larger than the base of Y-shaped skive 16. A typical patch 52 has a core 54 of rubber-covered nylon (such as KEVLAR) fabric sandwiched between layers of vulcanizable rubber such as cushion gum, one of which serves as platform 50. Rubber-covered nylon fabric is commercially sold in rolls for use in making tires and comprises a plurality of generally parallel, spaced apart nylon cords running with the roll and embedded in unvulcanized rubber. It is preferred that core 54 be fabricated from a plurality of layers of said rubber-covered fabric arranged in a stack at an angle to each other.

When platform 50 is an integral part of patch 52, patch 52 is adhered to coat of rubber cement 48 at the base of Y-shaped skive 16. As with platform 50, this can be accomplished by thumbing down the patch and then stitching the patch with a roller working from the center.

After platform 50 has been installed, Y-shaped skive 16 must be filled with a plug 56 of unvulcanized rubber. For this purpose, natural rubber is preferred and it is convenient to cut a number of strips of cushion gum. Depending on ambient conditions, it may be necessary to warm the strips on a suitable warming device (e. g., such as a warming tray) so that the gum is malleable but not scorched. The gum is then packed into Y-shaped skive with an appropriate blunt tool to prevent injuring lace 30. It is important that the gum strips be packed as compactly as possible to avoid entrapping air which can cause the repair to fail in the future. After the skive has been filled to the point where a stitcher (i.e., a kind of roller) can be used, the process can be more quickly completed with a stitcher. At the end, the skive should have an overbuild 58 of vulcanizable rubber of approximately ¼ inch above the tire surface.

As in an ordinary sectional tire repair, vent cords may be installed in Y-shaped skive 16 at the base of plug 56. As will be understood by those skilled in the art, the purpose of the vent cords is to remove air from the cord body of the tire. They should be made of cotton for proper adhesion to the rubber used in filling the skive and must extend beyond the repair area. Vent cords should not be used with a radial tire as moisture could flow along the strings allowing the steel cables or belts to rust.

After Y-shaped skive 16 has been filled with plug 56, tire 10 is placed in a device having sufficient curing capacity to vulcanize platform 50 (and patch 52 when present) along with plug 56. A suitable section mold for this purpose is sold by Vulcan Equipment Company Ltd. of Toronto, Canada. As will be understood by those skilled in the art, the curing time depends on the depth of Y-shaped skive 16 and the thickness of patch 52. A look-up table can be provided for use in the field.

While heat vulcanization is preferred, cold vulcanization is not entirely ruled out. For example, when platform 50 is not a part of patch 52, the plug and the platform can be vulcanized with a spotter and patch 52 chemically vulcanized. A spotter usually does not have enough curing capacity to cure the patch along with the plug. In some instances perhaps, plug 56 could be chemically vulcanized but with existing technology the plug would likely be too spongy and weak for most purposes.

Figure 8:
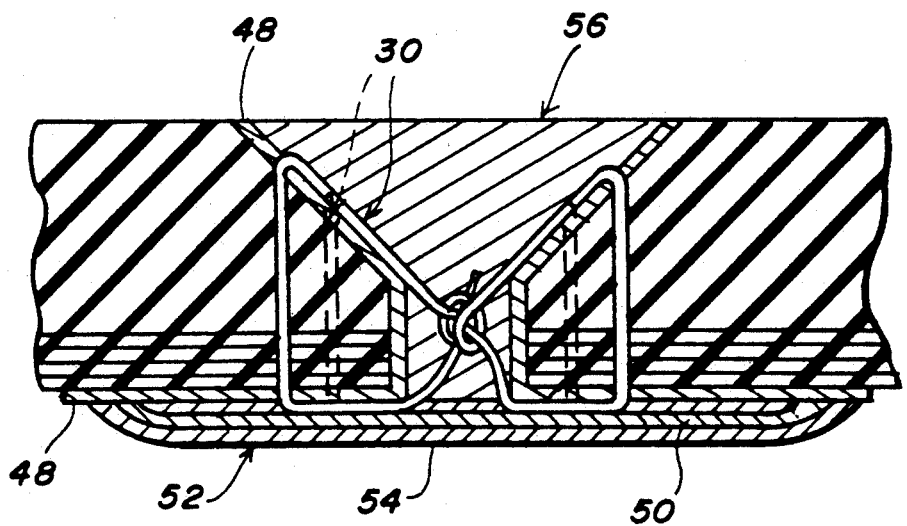

After patch 52 and plug 56 have been vulcanized, the tire can be retreaded in the usual manner. If tire 10 is to be returned to service immediately and not retreaded, the repair area is dressed down (i.e., overbuild 58 is removed) with a buffer to the original contour of the tire as shown in FIG. 8. If the repair area falls in a tread, the damming material is removed and the tread line marked and regrooved. Tire 10 is then ready to be returned to service with an ordinary life expectancy as though no injury had ever occurred.

In view of the above, it will be seen that the several objects of the invention are achieved and other advantageous results attained. As various changes could be made in the above methods and constructions without departing from the scope of the invention, it is intended that all matter contained in the above description or shown in the accompanying drawings shall be interpreted as illustrative and not in a limiting sense.

What is claimed is:

1. A method of making a sectional repair to a pneumatic tire having an injury in the crown, shoulder or sidewall comprising:

preparing the tire which includes the steps of inspecting the tire, locating the injury and removing the injuring object if still present, forming a Y-shaped skive having a flanged surface flared outwardly and angled upwardly from the injury and a stem having a surface connecting with the inner wall of the tire and preparing the surfaces of the Y-shaped skive and inner wall around the injury for adhesion of vulcanizable rubber;

lacing the Y-shaped skive which includes the steps of forming plural opposing pairs of lace holes in the flanged surface passing from the inside to the outside of the tire and lacing the lace holes with a lace and further including the step of knotting the lace between each opposing pair of lace holes;

blocking the base of the Y-shaped skive with a platform of unvlucanized rubber;

filling the Y-shaped skive with unvulcanized rubber in a manner to exclude entrapment of air to a level which is above the outer surface of the tire forming a plug; and, vulcanizing the unvulcanized rubber in the plug and the platform whereby the injury is closed and the tire can be returned to service.

2. The process of claim 1 wherein the lace holes are formed in the flanged surface of the Y-shaped skive below the shoulders thereof and are provided in pairs at alternating distances from the edges of the injury whereby the lace is embedded in the plug and the plug is less likely to rupture if a section of the lace is broken or pulled through a lace hole.

3. The process of claim 2 wherein the lace is formed of tire cord.

4. The process of claim 3 wherein the platform is an integral part of a patch having a core of tire fabric sandwiched between layers of unvulcanized rubber.

5. The tire repaired by the process of claim 1.
6. The tire repaired by the process of claim 2.
7. The tire repaired by the process of claim 3.
8. The tire repaired by the process of claim 4.

9. A method of making a sectional repair to a pneumatic tire having an injury in the crown, shoulder or sidewall comprising:

preparing the tire which includes the steps of inspecting the tire, locating the injury and removing the injuring object if still present, removing damaged material from the injury, forming a Y-shaped skive having a flanged surface flared outwardly and angled upwardly from the injury and a stem having a interior surface connecting with the inner wall of the tire and preparing the surfaces of the Y-shaped skive and inner wall around the injury for adhesion of vulcanizable rubber;

lacing the Y-shaped skive which includes the steps of forming lace holes passing from the inside to the outside of the tire in the flanged surface of the Y-shape skive below the shoulders thereof at the ends of the injury and along the injury in opposing pairs at alternating distances from the edges of the injury, lacing the lace holes together with a lace formed of tire cord and knotting the lace between opposing pairs of lace holes;

blocking the base of the Y-shaped skive which includes the steps of applying a rubber adhesive of unvulcanized rubber to the prepared inner wall around the injury and adhering a platform of unvulcanized rubber to the rubber adhesive, said platform being larger than the base of the Y-shaped skive;

filling the Y-shaped skive with unvulcanized rubber which includes the steps of applying a rubber adhesive of unvulcanized rubber to the prepared surfaces of the Y-shaped skive, forming strips of cushion gum and packing the strips of cushion gum into the skive in a manner to prevent entrapment of air to a level which is above the outer surface of the tire forming a plug; and the unvulcanized rubber in the plug, platform and adhesive whereby the injury is closed and the tire can be returned to service.

10. The process of claim 9 wherein the lace is a bundle of tire cords equal in number to the ply rating of the tire.

11. The process of claim 10 wherein the tire cord is nylon.

12. The process of claim 11 wherein the platform is an integral part of a patch having a core formed of overlapping layers of tire fabric arranged in a stack at an angle to each other and sandwiched between layers of unvulcanized rubber.

13. The process of claim 12 wherein the tire fabric is nylon embedded in unvulcanized rubber.

14. The process of claim 13 wherein the repair is vulcanized in a sectional tire mold.

15. The tire repaired by the process of claim 9.
16. The tire repaired by the process of claim 10.
17. The tire repaired by the process of claim 11.
18. The tire repaired by the process of claim 12.
19. The tire repaired by the process of claim 13.
20. The tire repaired by the process of claim 14.

* * * * *